(12) United States Patent
Aoyama et al.

(10) Patent No.: US 11,237,265 B2
(45) Date of Patent: Feb. 1, 2022

(54) TRANSMISSION/RECEPTION CONTROL DEVICE

(71) Applicant: DENSO CORPORATION, Kariya (JP)

(72) Inventors: Tetsuya Aoyama, Kariya (JP); Yu Koyama, Kariya (JP); Satoru Noro, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/867,421

(22) Filed: May 5, 2020

(65) Prior Publication Data

US 2020/0264302 A1 Aug. 20, 2020

Related U.S. Application Data

(63) Continuation of application No. PCT/JP2018/037264, filed on Oct. 4, 2018.

(30) Foreign Application Priority Data

Nov. 7, 2017 (JP) .............................. JP2017-214856

(51) Int. Cl.
| | |
|---|---|
| *G01S 15/04* | (2006.01) |
| *G01S 15/931* | (2020.01) |
| *G08G 1/16* | (2006.01) |
| *H04B 11/00* | (2006.01) |

(52) U.S. Cl.
CPC ............ *G01S 15/04* (2013.01); *G01S 15/931* (2013.01); *G08G 1/16* (2013.01); *H04B 11/00* (2013.01)

(58) Field of Classification Search
None
See application file for complete search history.

(56) References Cited

U.S. PATENT DOCUMENTS 5,581,232 A * 12/1996 Tanaka ................... G01H 11/06
340/435
9,069,079 B2 * 6/2015 Tsuji ...................... G01S 15/931
(Continued)

FOREIGN PATENT DOCUMENTS

| JP | H0454480 A | 2/1992 |
| JP | H10213658 A | 8/1998 |

(Continued)

*Primary Examiner* — Fekadeselassie Girma
(74) *Attorney, Agent, or Firm* — Maschoff Brennan (57) ABSTRACT

A transmission/reception control device is configured to control transmission and reception in an ultrasonic sensor. The ultrasonic sensor includes an ultrasonic transducer. The ultrasonic transducer is configured to transmit a probe wave as an ultrasonic wave and receive a reception wave. The reception wave includes a reflected wave of the probe wave. The transmission/reception control device includes a transmission frequency setting unit, a reception signal processing unit, and an object detection unit. The transmission frequency setting unit sets a frequency of the probe wave to a transmission frequency different from a resonance frequency of the ultrasonic transducer. The reception signal processing unit processes a reception result of the reception wave based on the probe wave transmitted with the transmission frequency. The object detection unit detects the object based on a result of processing by the reception signal processing unit.

8 Claims, 4 Drawing Sheets

(56) References Cited

U.S. PATENT DOCUMENTS

| | | | |
|---|---|---|---|
| 2008/0232197 A1* | 9/2008 | Kojima | G01S 15/931 367/99 |
| 2009/0009306 A1* | 1/2009 | Magane | G01S 15/931 340/435 |
| 2009/0267797 A1* | 10/2009 | Kim | G01S 15/931 340/932.2 |
| 2011/0003614 A1 | 1/2011 | Langereis et al. | |
| 2016/0238700 A1* | 8/2016 | Matsuura | G01S 15/931 |
| 2017/0223478 A1* | 8/2017 | Jot | G10L 19/008 |
| 2018/0222382 A1* | 8/2018 | Inoue | G01S 15/931 |
| 2020/0096633 A1* | 3/2020 | Matsuura | G01S 15/32 |
| 2020/0317217 A1* | 10/2020 | Tsuzuki | B60R 21/00 |

FOREIGN PATENT DOCUMENTS

| | | | | |
|---|---|---|---|---|
| JP | 2003248051 A | | 9/2003 | |
| JP | 2008306636 A | | 12/2008 | |
| JP | 2010230425 A | | 10/2010 | |
| JP | 2013104689 A | | 5/2013 | |
| JP | 2014232068 A | | 12/2014 | |
| JP | 2016125987 A | * | 7/2016 | G01S 7/524 |
| JP | 2017015493 A | | 1/2017 | |
| JP | 2017075841 A | | 4/2017 | |
| JP | 2017108339 A | | 6/2017 | |

* cited by examiner

TRANSMISSION/RECEPTION CONTROL DEVICE

CROSS-REFERENCE TO RELATED APPLICATION

The present application is a continuation application of International Application No. PCT/JP2018/037264, filed Oct. 4, 2018, which claims priority to Japanese Patent Application No. 2017-214856, filed Nov. 7, 2017. The contents of these applications are incorporated herein by reference in their entirety.

BACKGROUND

1. Technical Field

The present disclosure relates to an ultrasonic sensor and a transmission/reception control device that controls transmission and reception by the ultrasonic sensor.

2. Related Art

There have been known ultrasonic obstacle detection devices that have an ultrasonic sensor mounted in a vehicle to detect obstacles surrounding the vehicle. This kind of obstacle detection device transmits a probe wave as an ultrasonic wave from an ultrasonic transducer and receives a reception wave using the ultrasonic transducer. The reception wave includes a reflected wave of the probe wave from an object surrounding the vehicle.

SUMMARY

The present disclosure provides a transmission/reception control device. As an aspect of the present disclosure, a transmission/reception control device is configured to control transmission and reception in an ultrasonic sensor. The ultrasonic sensor includes an ultrasonic transducer. The ultrasonic transducer is configured to transmit a probe wave as an ultrasonic wave and receive a reception wave. The reception wave includes a reflected wave of the probe wave from a surrounding object.

According to an aspect of the present disclosure, the transmission/reception control device includes a transmission frequency setting unit, a reception signal processing unit, and an object detection unit.

The transmission frequency setting unit sets a frequency of the probe wave to a transmission frequency different from a resonance frequency of the ultrasonic transducer.

The reception signal processing unit processes a reception result of the reception wave based on the probe wave transmitted with the transmission frequency.

The object detection unit detects the object based on a result of processing by the reception signal processing unit.

DETAILED DESCRIPTION OF THE PREFERRED EMBODIMENTS

As is well known, while the reverberation generated after the transmission of the probe wave has a predetermined or greater signal intensity, the ultrasonic sensor cannot correctly receive the reflected wave. Specifically, if an obstacle exists at a close range, the reflected wave overlaps the reverberation waveform. Thus, JP H10-213658 A (hereinafter referred to as "PTL 1") and others have conventionally proposed various countermeasures against reverberation in an ultrasonic sensor.

For example, as disclosed in JP 2017-15493 A, there has been known an anti-reverberation measure of masking a reception signal until a lapse of a predetermined time after transmission of a probe wave. Otherwise, for example, the device disclosed in PTL 1 includes a detection distance switching means that decreases the amplification factor of the reception wave to switch to a short-range obstacle detection mode. According to the configuration disclosed in PTL 1, decreasing the amplification factor allows early convergence of a reverberation waveform.

However, there is still room for a lot of improvement in the various conventionally proposed anti-reverberation measures. For example, according to the masking method as described above, the masking time will become long unless the reverberation waveform converges early. This makes it difficult to favorably detect objects at short range.

On the other hand, according to the anti-reverberation measure disclosed in PTL 1, the detection distance switching means decreases the amplification factor of the reception wave in the short-range obstacle detection mode. In this case, the amplification factor will decrease not only for the reverberation waveform but also for a reflected wave from an object in the short range. Therefore, there is a possibility of reduction of the capability of detecting an object at short range.

The present disclosure is devised in view of the circumstances described above as examples. Specifically, the present disclosure is intended to provide a configuration that suppresses adverse influence of reverberation on detecting objects at close range as much as possible in an ultrasonic sensor.

A transmission/reception control device is configured to control transmission and reception in an ultrasonic sensor. The ultrasonic sensor includes an ultrasonic transducer. The ultrasonic transducer is configured to transmit a probe wave as an ultrasonic wave and receive a reception wave. The reception wave includes a reflected wave of the probe wave from a surrounding object.

According to an aspect of the present disclosure, the transmission/reception control device includes:

a transmission frequency setting unit that sets a frequency of the probe wave to a transmission frequency different from a resonance frequency of the ultrasonic transducer;

a reception signal processing unit that processes a reception result of the reception wave based on the probe wave transmitted with the transmission frequency; and an object detection unit that detects the object based on a result of processing by the reception signal processing unit.

According to this configuration, a reverberation time is adjusted by setting the frequency of the probe wave for detecting the object to the transmission frequency different from the resonance frequency of the ultrasonic transducer.

That is, according to this configuration, the reverberation time is more favorably shortened than in a case where the transmission frequency is the resonance frequency. Therefore, according to this configuration, it is possible to suppress the adverse influence of reverberation on detecting objects at close range as much as possible in the ultrasonic sensor.

The parenthesized reference signs given to the elements indicate mere examples of correspondences between the elements and specific means of embodiments described later. Therefore, the present disclosure is not limited by the description of the reference signs.

Hereinafter, embodiments will be described with reference to the drawings. Various modifications applicable to one embodiment will be collectively explained after the description of the embodiment because there is a risk that mixing description of the modifications with the description of the embodiment may impair understanding of the embodiment.

(Entire Configuration)

Figure 1:
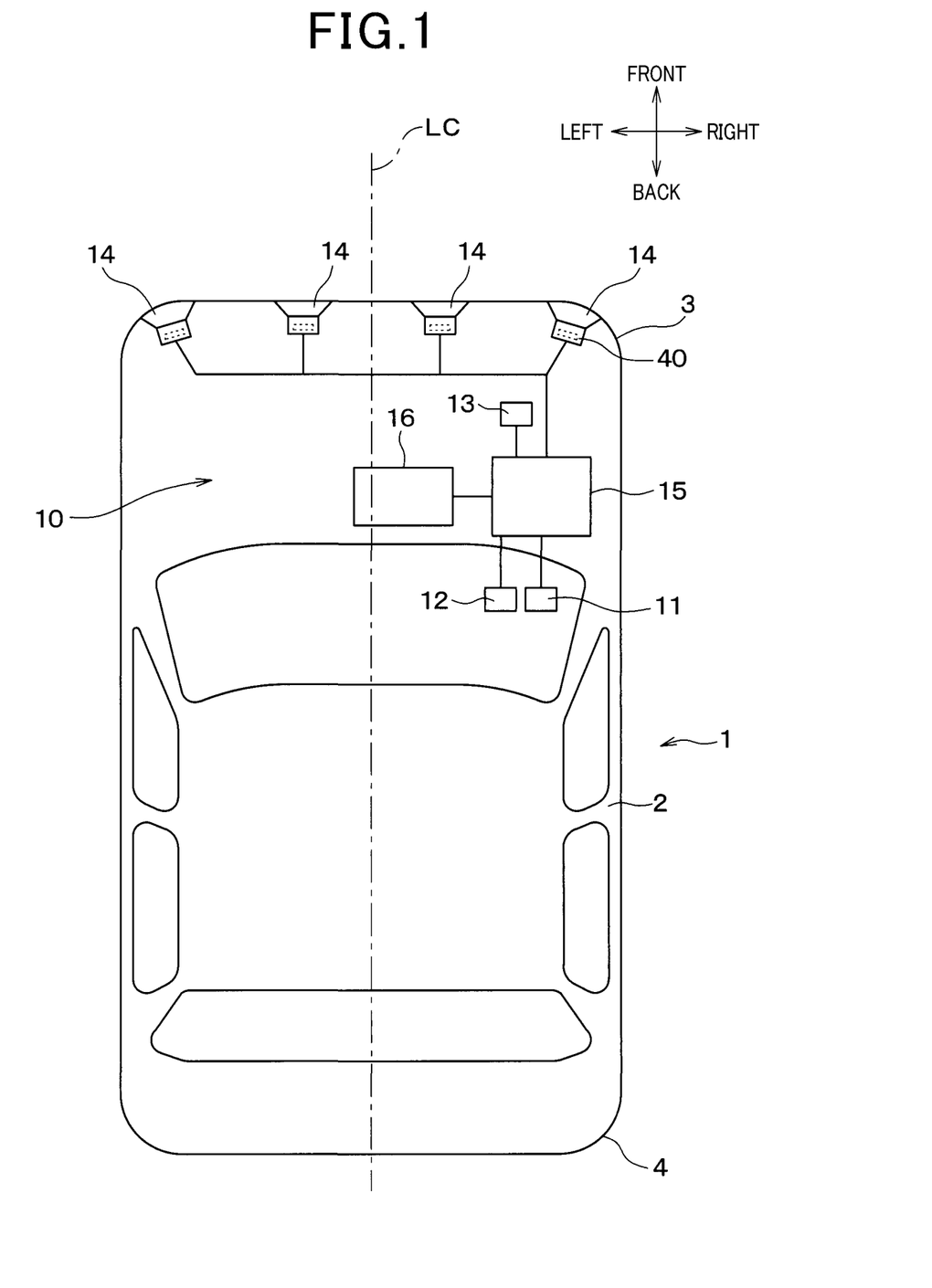
FIG. 1 is a schematic view of entire configuration of a vehicle equipped with an obstacle detection device.

Referring to FIG. 1, a vehicle 1 is a four-wheeled automobile that includes a vehicle body 2 that is substantially rectangular in planar view. The concepts of "front", "back", "left", and "right" of the vehicle 1 and the vehicle body 2 are as shown by arrows in FIG. 1. Hereinafter, the horizontal direction will also be called "vehicle width direction", and the longitudinal direction will also be called "overall vehicle length direction". The overall vehicle length direction is parallel to a vehicle center line LC that passes through a center of the vehicle body 2 as seen in the vehicle width direction.

The vehicle body 2 has a front bumper 3 attached to a front end. The vehicle body 2 has a rear bumper 4 attached to a rear end.

The vehicle 1 has an obstacle detection device 10. The obstacle detection device 10 includes a vehicle velocity sensor 11, a shift position sensor 12, a temperature sensor 13, a plurality of ultrasonic sensors 14, an obstacle detection ECU 15, and a notification unit 16. The ECU is an abbreviate for electronic control unit. The vehicle velocity sensor 11, the shift position sensor 12, the temperature sensor 13, the plurality of ultrasonic sensors 14, and the notification unit 16 are connected to the obstacle detection ECU 15 via a communication line such as an in-vehicle network.

The vehicle velocity sensor 11 is provided to generate an electrical output (for example, voltage) corresponding to the running velocity of the vehicle 1, that is, vehicle velocity. The shift position sensor 12 is provided to output an electrical signal corresponding to the shift position of the vehicle 1. The temperature sensor 13 is provided to generate an electrical output (for example, voltage) corresponding to the outside temperature, that is, the surrounding temperature of the vehicle 1.

The ultrasonic sensors 14 is configured to detect an object surrounding the vehicle 1 by transmission and reception of ultrasonic waves. Specifically, the ultrasonic sensors 14 is provided to output an electrical signal corresponding to a distance between the ultrasonic sensors 14 and the object surrounding the vehicle 1.

The plurality of ultrasonic sensors 14 is attached to the front bumper 3 to transmit ultrasonic waves to the area in front of the vehicle 1. The plurality of ultrasonic sensors 14 attached to the front bumper 3 is aligned along the vehicle width direction. The plurality of ultrasonic wave sensors 14 is attached to the rear bumper 4 as well to transmit ultrasonic waves to the area behind the vehicle 1. For simplification of illustration, FIG. 1 does not illustrate the plurality of ultrasonic sensors 14 attached to the rear bumper 4. A configuration of the ultrasonic sensors 14 will be described later in detail.

The obstacle detection ECU 15 is an in-vehicle microcomputer that controls the entire operation of the obstacle detection device 10, which includes a CPU, ROM, RAM, non-volatile RAM, and others that are not illustrated. Specifically, the obstacle detection ECU 15 is configured to implement various control operations by the CPU reading and activating programs from the ROM or non-volatile RAM. The non-volatile RAM is a flash ROM or the like, for example.

Specifically, the obstacle detection ECU 15 is configured to cause each of the plurality of ultrasonic sensors 14 to execute transmission/reception operations when a predetermined detection operation execution condition is satisfied. The obstacle detection ECU 15 is provided to receive a result of object detection from each of the plurality of ultrasonic sensors 14 to detect an obstacle surrounding the vehicle 1. The notification unit 16 is provided to, when the obstacle detection ECU 15 detects an obstacle, execute a notification operation corresponding to the relative positions of the vehicle 1 and the obstacle.

(Configuration of the Ultrasonic Sensors)

Each of the ultrasonic sensors 14 includes an ultrasonic transducer 40. The ultrasonic transducer 40 is configured to transmit a probe wave as an ultrasonic wave and receive a reception wave. The reception wave includes a reflected wave of the probe wave from an object surrounding the vehicle 1. The mechanical structures of the ultrasonic sensors 14 and the ultrasonic transducers 40 are already known as of the filing of the present application as described in, for example, U.S. Patent Application Publication No. 2008/0184802, German Patent Application Publication No. 102008007042, Chinese Patent Application Publication No. 101241183, and others. Thus, the detailed description of the mechanical structures of the ultrasonic sensors 14 and the ultrasonic transducers 40 are omitted herein. When the national law permits, the descriptions in these specifications of patent applications are incorporated herein by reference.

Figure 2:
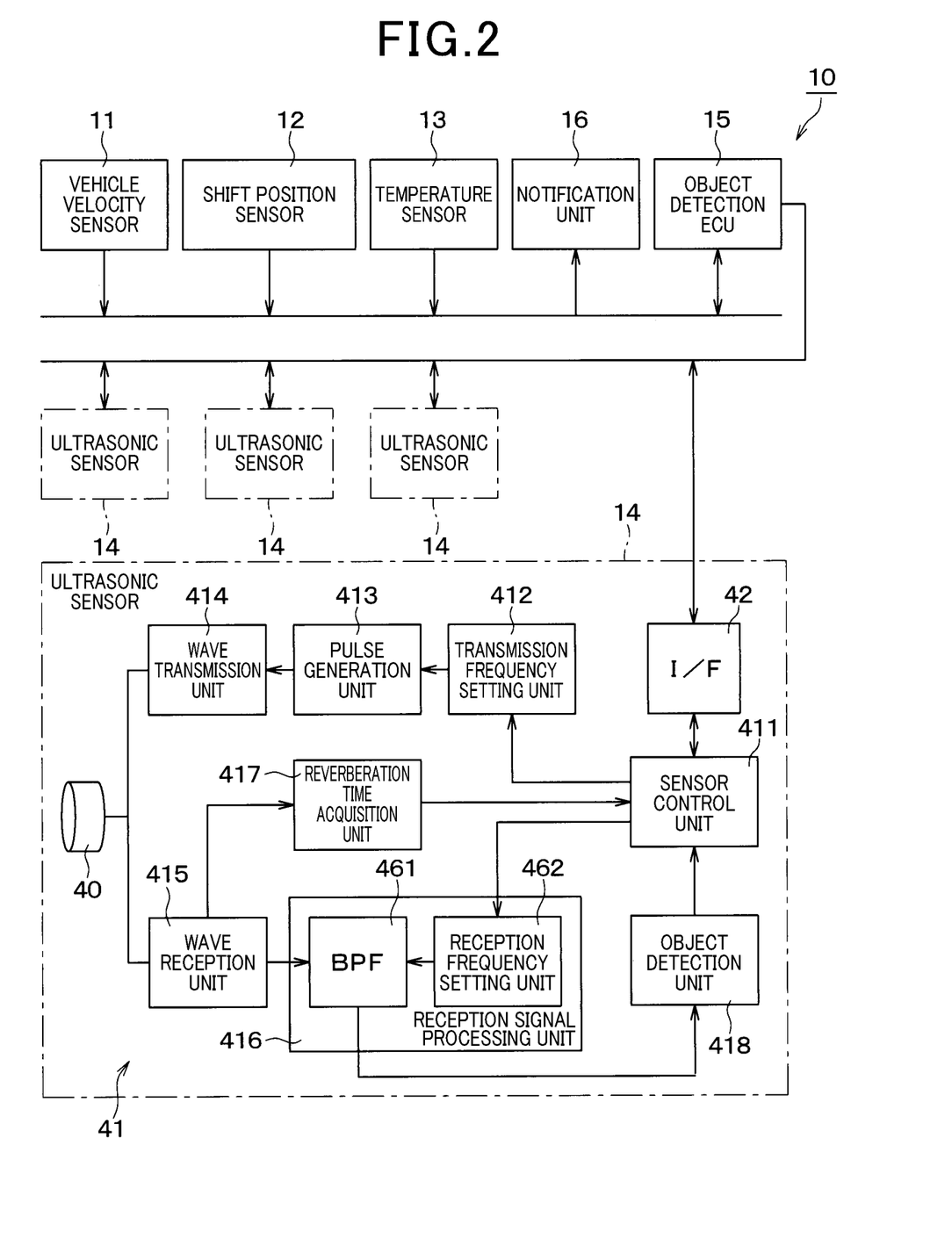
FIG. 2 is a block diagram illustrating a functional configuration of the obstacle detection device illustrated in FIG. 1.

Hereinafter, a functional configuration of the ultrasonic sensors 14 will be described in detail with reference to FIG. 2. As illustrated in FIG. 2, each of the ultrasonic sensors 14 includes the ultrasonic transducer 40, a transmission/reception control device 41, and an input/output interface 42.

The transmission/reception control device 41 and the input/output interface 42 are provided as functional elements of a sensor ECU built in the ultrasonic sensor 14. The sensor ECU is an in-vehicle microcomputer that controls the entire operation of the ultrasonic sensor 14, which includes a CPU, ROM, RAM, non-volatile RAM, and others not illustrated. Specifically, the sensor ECU is configured to implement various control operations by the CPU reading and activating programs from the ROM or non-volatile RAM. The non-volatile RAM is a flash ROM or the like, for example.

The transmission/reception control device 41 is configured to control transmission/reception operations by the ultrasonic sensor 14, that is, the ultrasonic transducer 40 and to generate an electrical signal corresponding to the detection result of an object based on the transmission/reception results. A functional configuration of the transmission/reception control device 41 will be described later in detail. The input/output interface 42 is provided to transmit and receive a signal to and from the obstacle detection ECU 15 and others via a communication line such as an in-vehicle network.

The transmission/reception control device 41 has a sensor control unit 411, a transmission frequency setting unit 412, a pulse generation unit 413, a wave transmission unit 414, a wave reception unit 415, a reception signal processing unit 416, a reverberation time acquisition unit 417, and an object detection unit 418.

The sensor control unit 411 is provided to control the entire operation of the ultrasonic sensor 14. The sensor control unit 411 has initial values and data in tables or the like pre-stored therein.

The transmission frequency setting unit 412 is provided to set a frequency of the probe wave based on a command signal received from the sensor control unit 411. Specifically, the transmission frequency setting unit 412 is configured to set the frequency of the probe wave to a transmission frequency different from a resonance frequency of the ultrasonic transducer 40.

The pulse generation unit 413 is provided to generate an ultrasonic pulse signal for transmitting the probe wave based on the transmission frequency set by the transmission frequency setting unit 412. The wave transmission unit 414 is a transmission circuit unit that is provided to drive the ultrasonic transducer 40 based on an ultrasonic pulse signal generated by the pulse generation unit 413.

The wave reception unit 415 is a reception circuit unit that is provided to generate a reception signal corresponding to the reception wave in the ultrasonic transducer 40. The reception signal processing unit 416 is provided to process the reception signal generated by the wave reception unit 415. That is, the reception signal processing unit 416 is configured to process the reception result of the reception wave based on a probe wave transmitted with a transmission frequency different from the resonance frequency of the ultrasonic transducer 40.

Specifically, the reception signal processing unit 416 has a band-pass filter 461 and a reception frequency setting unit 462. The reception frequency setting unit 462 is provided to set a central frequency of a pass frequency band in the band-pass filter 461 based on the command signal received from the sensor control unit 411. Specifically, the reception frequency setting unit 462 is configured to set the central frequency of the pass frequency band in the band-pass filter 461 to a non-resonance frequency different from the resonance frequency of the ultrasonic transducer 40.

The reverberation time acquisition unit 417 is provided to acquire, that is, measure, the reverberation time of the ultrasonic transducer 40 based on the reception signal generated by the wave reception unit 415. The object detection unit 418 is provided to detect an object based on the result of processing by the reception signal processing unit 416. That is, the object detection unit 418 is configured to calculate a distance to the object and detect the amplitude of the reception wave based on the reception signal processed by the band-pass filter 461.

(Overview of Operations)

Hereinafter, an overview of operations of the obstacle detection device 10 configured as described above will be provided.

The obstacle detection ECU 15 determines the presence or absence of satisfaction of the detection operation execution condition based on the output signals from the vehicle velocity sensor 11 and the shift position sensor 12. When the detection operation execution condition is satisfied, the obstacle detection ECU 15 executes the obstacle detection operation by causing each of the plurality of ultrasonic sensors 14 to repeatedly execute the object detection operation at predetermined time intervals.

Specifically, the obstacle detection ECU 15 acquires the outside temperature, that is, the surrounding temperature of the vehicle 1, based on the output of the temperature sensor 13. The acquired temperature can be used as an estimated value of the temperature of the ultrasonic sensors 14. The temperature of the ultrasonic sensors 14 will be hereinafter called "sensor temperature".

The obstacle detection ECU 15 transmits detection conditions to the sensor control unit 411 of each of the plurality of ultrasonic sensors 14. The "detection conditions" are object detection operation conditions in each of the plurality of ultrasonic sensors 14. Specifically, the "detection conditions" include sensor temperature, vehicle velocity, and detection distance range. The "detection distance range" refers to a range of an object detection distance from each of the plurality of ultrasonic sensors 14. For example, the detection distance range at the time of spatial detection such as detection of a parking space is longer than the detection distance range at the time of obstacle detection while the vehicle is parked. The former mode will be called long-distance mode and the latter will be called short-distance mode.

Based on the acquired detection condition, the sensor control unit 411 generates a command signal for setting frequencies by the transmission frequency setting unit 412 and the reception frequency setting unit 462. The transmission frequency setting unit 412 sets the frequency of the probe wave based on the command signal received from the sensor control unit 411.

The transmission frequency setting unit 412 sets the frequency of the probe wave to the transmission frequency different from the resonance frequency of the ultrasonic transducer 40. Specifically, the transmission frequency setting unit 412 sets the transmission frequency in accordance with the detection conditions. That is, the transmission frequency setting unit 412 sets the transmission frequency in accordance with the detection distance range and/or the sensor temperature.

The reception frequency setting unit 462 sets the central frequency of the pass frequency band in the band-pass filter 461 to a non-resonance frequency different from the resonance frequency of the ultrasonic transducer 40. Specifically, the reception frequency setting unit 462 sets the central frequency in accordance with the detection conditions. That is, the reception frequency setting unit 462 sets the central frequency in accordance with the detection distance range and/or the vehicle velocity.

The ultrasonic transducer 40 transmits the probe wave based on an ultrasonic pulse signal of the transmission frequency that is generated as described above to be different from the resonance frequency. When the ultrasonic transducer 40 receives the reception wave including a reflected wave, the wave reception unit 415 generates the reception signal. The generated reception signal is processed by the reception signal processing unit 416, that is, the band-pass filter 461.

The reverberation time acquisition unit 417 acquires the reverberation time based on the reception signal generated by the wave reception unit 415 and transmits the acquisition result to the sensor control unit 411. The object detection unit 418 calculates the distance to the object based on the reception signal processed by the band-pass filter 461. The object detection unit 418 detects the amplitude of the reception wave. The object detection unit 418 transmits the calculation result of the distance and the detection result of the amplification to the sensor control unit 411. The sensor control unit 411 transmits the calculation result of the distance and the detection result of the amplitude to the obstacle detection ECU 15.

Advantageous Effects

Hereinafter, advantageous effects produced by the thus configured ultrasonic sensors 14 and transmission/reception control devices 41 will be described.

According to this configuration, the reverberation time is adjusted by setting the frequency of the probe wave for detecting an object to the transmission frequency different from the resonance frequency of the ultrasonic transducer 40. That is, according to this configuration, the reverberation time is more favorably shortened than in a case where the transmission frequency is the resonance frequency. Therefore, according to this configuration, it is possible to suppress the adverse influence of reverberation on detecting objects at close range as much as possible in the ultrasonic sensor 14. In particular, it is possible to favorably detect objects at short range.

The resonance frequency of the ultrasonic transducer 40 fluctuates in accordance with temperature. Thus, in this configuration, the frequency of the probe wave is set in accordance with temperature. Therefore, according to this configuration, it is possible to favorably suppress the adverse influence of reverberation even if the resonance frequency of the ultrasonic transducer 40 fluctuates in accordance with the temperature.

In the long-distance mode, unlike in the short-distance mode, the adverse influence of the reverberation is small. Thus, in the long-distance mode, unlike in the short-distance mode, the probe wave favorably matches the resonance frequency of the ultrasonic transducer 40. Thus, in this configuration, the frequency of the probe wave is set in accordance with the detection distance range. Therefore, according to this configuration, it is possible to perform favorable object detection regardless of the detection distance range.

Further, in this configuration, the central frequency of the pass frequency band in the band-pass filter 461 is set to the non-resonance frequency different from the resonance frequency of the ultrasonic transducer 40. According to this configuration, it is possible to favorably remove the reverberation waveform depending on the resonance frequency of the ultrasonic transducer 40. In the present embodiment, in particular, the central frequency is set in accordance with the object detection conditions. Therefore, the S/N ratio can be favorably obtained.

When the transmission frequency is made higher than the resonance frequency, "whine" is prone to occur. Thus, the transmission frequency is preferably lower than the resonance frequency.

However, when foreign matter or the like such as mud is attached to the ultrasonic transducer 40, the resonance frequency fluctuates. For example, the attachment of the foreign matter may shift the resonance frequency toward a lower frequency side. In this case, when the transmission frequency is made lower than the resonance frequency before the attachment of the foreign matter, the transmission frequency may be close to the resonance frequency after the attachment of the foreign matter. On the other hand, the attachment of the foreign matter may shift the resonance frequency to a higher frequency side.

Therefore, if the reverberation time exceeds a threshold by execution of one of a frequency decreasing process of setting the transmission frequency to be lower than the resonance frequency and a frequency increasing process of setting the transmission frequency to be higher than the resonance frequency, the transmission frequency setting unit 412 preferably executes the other of these processes. This makes it possible to suppress the adverse influence of the reverberation on detecting objects at close range as much as possible even with the attachment of foreign matter to the ultrasonic transducer 40.

SPECIFIC EXAMPLES

Hereinafter, specific operation examples according to the present embodiment will be described with reference to the flowchart. In the drawings and the description herein, the term "step" will be simply abbreviated as "S". The CPU, ROM, RAM, and non-volatile RAM in the sensor ECU built in the ultrasonic sensor 14 will be simply called CPU, ROM, RAM, and non-volatile RAM.

First Specific Example

Figure 3:
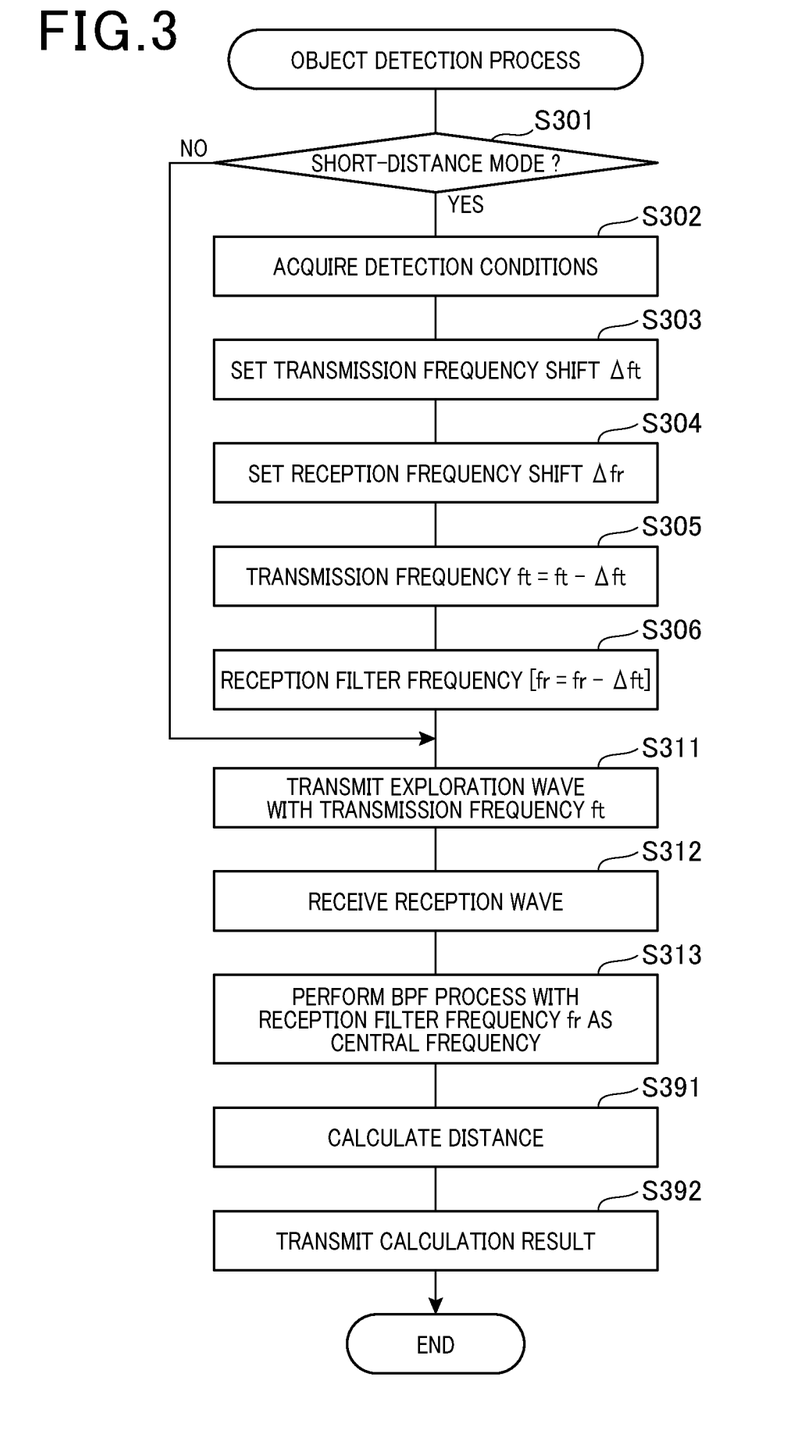
FIG. 3 is a flowchart of a first operation example of an ultrasonic sensor illustrated in FIG. 2.

An object detection process routine shown in FIG. 3 is repeatedly activated at predetermined time intervals based on an activation command from the obstacle detection ECU 15 while the detection operation execution condition is satisfied. That is, the obstacle detection ECU 15 repeatedly transmits the activation command to each of the plurality of ultrasonic sensors 14 at the predetermined time intervals. The same applies to an object detection process routine shown in FIG. 4.

Upon receipt of the activation command, the CPU in the sensor ECU of the ultrasonic sensor 14 reads the object detection process routine shown in FIG. 3 from the ROM or the non-volatile RAM and activates the same. When the object detection process routine shown in FIG. 3 is activated, the CPU first determines in S301 whether the current operation mode is the short-distance mode. The information on whether the current operation mode is the short-distance mode is included in the received activation command and temporarily stored in the RAM.

When the current operation mode is the short-distance mode (that is, S301=YES), the CPU executes S302 to S306, and then moves the process to S311. In contrast to this, when the current operation mode is the long-distance mode (that is, S301=NO), the CPU skips S302 to S306 and moves the process to S311 and subsequent steps.

In S302, the CPU acquires the detection conditions including a vehicle velocity V and a sensor temperature Ts. Next, in S303, the CPU sets a transmission frequency shift $\Delta ft$ based on the detection conditions acquired in S302. Specifically, the CPU sets the transmission frequency shift $\Delta ft$ based on a table $\Delta ft(Ts)$ having the sensor temperature Ts as a parameter and the sensor temperature Ts acquired based on the output of the temperature sensor 13.

Subsequently, in S304, the CPU sets a reception frequency shift $\Delta fr$ based on the detection conditions acquired in S302. Specifically, the CPU sets the reception frequency shift $\Delta fr$ based on a table $\Delta fr(V)$ having the vehicle velocity V as a parameter and the vehicle velocity V acquired based on the output of the vehicle velocity sensor 11.

Subsequently, in S305, the CPU changes a transmission frequency ft as the frequency of the probe wave from an initial value f0 based on the transmission frequency shift $\Delta ft$. Specifically, the CPU sets the transmission frequency ft to a value obtained by subtracting $\Delta ft$ from the initial value f0. The value f0 corresponds to the resonance frequency of the ultrasonic transducer 40.

Subsequently, in S306, the CPU changes a reception filter frequency fr from the initial value f0 based on the reception frequency shift Δfr. Specifically, the CPU sets the reception filter frequency fr to a value obtained by subtracting Δfr from the initial value f0. The reception filter frequency fr corresponds to the central frequency of the pass frequency band in the band-pass filter 461.

In S311, the CPU executes a transmission process of the probe wave with the transmission frequency ft. In the long-distance mode (that is, S301=NO), the transmission frequency ft takes on the initial value f0 that corresponds to the resonance frequency. In contrast to this, in the short-distance mode (that is, S301=YES), the transmission frequency ft is lower by Δft than the initial value f0 that corresponds to the resonance frequency.

Next, in S312, the CPU executes a generation process of the reception signal by the wave reception unit 415. Subsequently, in S313, the CPU processes the reception signal by the band-pass filter 461 with the central frequency of the pass frequency band as the reception filter frequency fr. In the long-distance mode (that is, S301=NO), the reception filter frequency fr takes on the initial value f0 that corresponds to the resonance frequency. In contrast to this, in the short-distance mode (that is, S301=YES), the reception filter frequency fr is lower by Δfr than the initial value f0 that corresponds to the resonance frequency.

After S313, the CPU moves the process to S391 and S392. In S391, the CPU calculates the distance to the object based on the reception signal processed by the band-pass filter 461. The CPU also detects the amplitude of the reception wave.

In S392, the CPU transmits the calculation result of the distance and the detection result of the amplitude to the obstacle detection ECU 15. Upon completion of S392, the CPU terminates this iteration of the routine.

Second Specific Example

Figure 4:
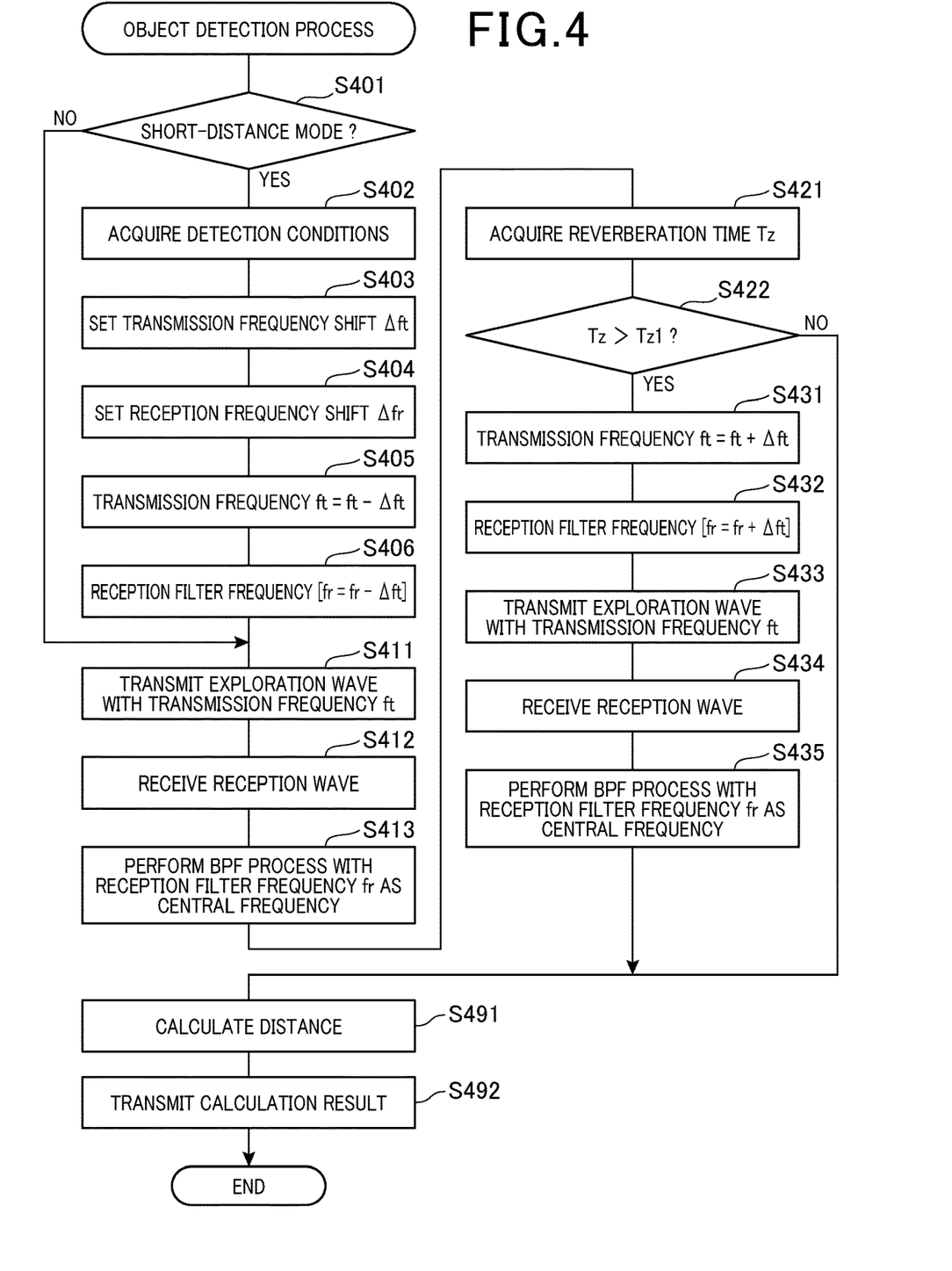
FIG. 4 is a flowchart of a second operation example of the ultrasonic sensor illustrated in FIG. 2.

The present specific example corresponds to an operation example in which, when the reverberation time exceeds a threshold by execution of one of the frequency decreasing process and the frequency increasing process in accordance with the attachment state of foreign matter, executes the other of these processes.

When the object detection process routine shown in FIG. 4 is activated, the CPU first executes S401 to S413. The steps S401 to S413 are identical to the steps S301 to S313 in the object detection process routine shown in FIG. 3. Therefore, the description of S401 to S413 is the same as the foregoing description of S301 to S313.

After S413, the CPU moves the process to S421 and S422. In S421, the CPU acquires a reverberation time Tz.

Next, in S421, the CPU determines whether the reverberation time Tz acquired in S421 exceeds a threshold Tz1. The threshold Tz1 is a value corresponding to the reverberation time Tz to be generated when the reverberation is favorably suppressed by a lowered frequency of the probe wave by the reception frequency shift Δfr on the presumption that there is no attachment of foreign matter. That is, the threshold Tz1 is a value sufficiently smaller than a reverberation time Tz0 in which the probe wave has the resonance frequency f0. In the present specific example, the threshold Tz1 is determined by experiment or using computer simulation and is stored in advance in the non-volatile RAM.

When the acquired reverberation time Tz exceeds the threshold Tz1 (that is, S422=YES), the CPU executes S431 to S435 and moves the process to S491. On the other hand, when the acquired reverberation time Tz does not exceed the threshold Tz1 (that is, S422=NO), the CPU skips S431 to S435 and moves the process to S491.

In S431, the CPU sets the transmission frequency ft to a value obtained by adding Δft to the initial value f0, contrary to the case in S405. Similarly, in S432, the CPU sets the reception filter frequency fr to a value obtained by adding Δfr to the initial value f0, contrary to the case in S406.

Next, in S433, the CPU executes the transmission process of the probe wave with the transmission frequency ft set in S431. Subsequently, in S434, the CPU executes the generation process of the reception signal by the wave reception unit 415. Further, in S435, the CPU processes the reception signal by the band-pass filter 461 using the reception filter frequency fr set in S432.

In S491, the CPU calculates the distance to the object based on the reception signal processed by the band-pass filter 461. The CPU also detects the amplitude of the reception wave. In S492, the CPU transmits the calculation result of the distance and the detection result of the amplitude to the obstacle detection ECU 15. Upon completion of S492, the CPU terminates this iteration of the routine.

In this way, according to the present specific example, the reverberation suppression with a shift of the resonance frequency due to the attachment of foreign matter can be favorably performed by a simple process. In addition, terminating the process for reverberation suppression in a short time allows more quick detection of the object existing within the short range.

Modification Example

The present disclosure is not limited to the foregoing embodiment. Therefore, the foregoing embodiment can be changed as appropriate. Hereinafter, a typical modification example will be described. The following modification example will be described mainly focusing on differences from the foregoing embodiment. The parts identical or equivalent to each other are given the same reference signs in the foregoing embodiment and the modification example. Therefore, in the following description of the modification example, for the constituent elements with the same reference signs as those of the foregoing embodiment, the description of the foregoing embodiment is incorporated herein as appropriate unless there is any technical contradiction.

The present disclosure is not limited to the specific device configuration described in relation to the foregoing embodiment. That is, for example, the vehicle 1 is not limited to a four-wheeled automobile. Specifically, the vehicle 1 may be a three-wheeled automobile or a six-wheeled or eight-wheeled automobile such as a cargo truck.

The temperature sensor 13 is typically a sensor prepared for another system such as an outside temperature sensor or engine intake air temperature sensor. However, the present disclosure is not limited to this mode. That is, the temperature sensor 13 may be built in the ultrasonic sensors 14.

There is no special limitation on the arrangement of the ultrasonic sensors 14. The plurality of ultrasonic sensors 14 may be the same or different in mounting height and/or mounting elevation angle. Some of the plurality of ultrasonic sensors 14 can be provided in a front grille.

In the foregoing embodiment, the sensor ECU that is built in the ultrasonic sensor 14 to constitute the transmission/reception control device 41 is configured such that the CPU reads and activates programs from the ROM or the like. However, the present disclosure is not limited to this configuration. That is, for example, the sensor ECU may be a digital circuit configured to be capable of the operations described above, for example, an ASIC such as a gate array. The term ASIC is an abbreviation for application specific integrated circuit.

The present disclosure is not limited to the specific operation examples and processing modes described above in relation to the foregoing embodiment. For example, in the object detection process routine shown in FIG. 3, in the long-distance mode (that is, S301=NO), the steps similar to S302 to S306 can be executed. In this modification example, the transmission frequency shift Δft and the reception frequency shift Δfr are set to be larger in the short-distance mode than in the long-distance mode. This allows favorable object detection in the short range.

As described above, the resonance frequency f0 of the ultrasonic transducer 40 fluctuates in accordance with temperature or the like. The resonance frequency f0 of the ultrasonic transducer 40 may cause individual differences due to a dimension error that is inevitable in manufacture.

Thus, the transmission/reception control device 41 may detect the resonance frequency f0 of the ultrasonic transducer 40 by operating the ultrasonic sensor 14 while the detection operation execution conditions are not satisfied. Similarly, the transmission/reception control device 41 may detect the reverberation time Tz0 of the ultrasonic transducer 40 in which the probe wave has the resonance frequency f0 by operating the ultrasonic sensor 14 while the detection operation execution conditions are not satisfied. Further, the transmission/reception control device 41 may set the threshold Tz1 in accordance with the foregoing detection result.

Otherwise, the transmission/reception control device 41 may execute a learning process of the transmission frequency shift Δft. That is, the transmission/reception control device 41 may acquire the transmission frequency shift Δft with which the reverberation time Tz is minimized by repeatedly acquiring the reverberation time Tz with the different values of the transmission frequency shift Δft. This matter also applies to the reception frequency shift Δfr.

The obstacle detection ECU 15 may change the activation interval of the object detection process routine in each of the plurality of ultrasonic sensors 14 in accordance with the detection distance range. Specifically, the obstacle detection ECU 15 may shorten the activation interval as the detection distance range becomes shorter.

It is obvious that the elements constituting the foregoing embodiment are not necessarily essential except when they are specifically described as essential or clearly considered to be essential on principle. When the numbers, values, quantities, and ranges of the constituent elements are specified, the present disclosure is not limited to these values unless these values are clearly described to be essential and the constituent elements are clearly limited to the specific values on principle. Similarly, when the shapes, directions, positional relationships, and others of the constituent elements are specified, the present disclosure is not limited to these shapes, directions, positional relationships, and others unless these shapes, directions, positional relationships, and others are clearly described to be essential and the constituent elements are limited to the shapes, directions, positional relationships, and others on principle.

The modification example is not limited to the foregoing examples. In addition, a plurality of modification examples can be combined. All or some parts of the foregoing embodiments can be combined with all or some parts of arbitrary modification examples.

What is claimed is:

1. A transmission/reception control device that controls transmission and reception in an ultrasonic sensor including an ultrasonic transducer configured to transmit a probe wave as an ultrasonic wave and receive a reception wave including a reflected wave of the probe wave, comprising:
    a transmission frequency setting unit that sets a frequency of the probe wave to a transmission frequency different from a resonance frequency of the ultrasonic transducer;
    a reception signal processing unit that processes a reception result of the reception wave based on the probe wave transmitted with the transmission frequency; and
    an object detection unit that detects an object based on a result of processing by the reception signal processing unit;
    a reverberation time acquisition unit that acquires a reverberation time of the ultrasonic transducer, wherein
    when the reverberation time exceeds a threshold in response to execution of a frequency, decreasing process of setting the transmission frequency to be lower than the resonance frequency, the transmission frequency setting unit executes a frequency increasing process of setting the transmission frequency to be higher than the resonance frequency, and
    when the reverberation time exceeds the threshold in response to execution of the frequency increasing process, the transmission frequency setting unit executes the frequency decreasing process.

2. The transmission/reception control device according to claim 1, wherein the transmission frequency is lower than the resonance frequency.

3. The transmission/reception control device according to claim 1, wherein the transmission frequency setting unit sets the transmission frequency in accordance with a detection condition of the object.

4. The transmission/reception control device according to claim 3, wherein the detection condition includes a detection distance range of the object.

5. The transmission/reception control device according to claim 3, wherein the detection condition includes a temperature of the ultrasonic sensor.

6. The transmission/reception control device according to claim 1, wherein the reception signal processing unit includes:
    a band-pass filter; and
    a reception frequency setting unit that sets a central frequency of a pass frequency band in the band-pass filter to a non-resonance frequency different from the resonance frequency.

7. The transmission/reception control device according to claim 6, wherein the reception frequency setting unit sets the non-resonance frequency in accordance with a speed of vehicle equipped with the ultrasonic sensor.

8. The transmission/reception control device according to claim 6, wherein the reception frequency setting unit sets the non-resonance frequency in accordance with a detection distance range of the object.

* * * * *